US010935345B2

(12) United States Patent
Ben Oren et al.

(10) Patent No.: US 10,935,345 B2
(45) Date of Patent: Mar. 2, 2021

(54) METHODS SYSTEMS CIRCUITS COMPONENTS APPARATUS DEVICES ASSEMBLIES AND COMPUTER EXECUTABLE CODE FOR AIMING A FIREARM

(71) Applicants: Michael Ben Oren, Ashqelon (IL); Ran Ben Oren, Ashqelon (IL)

(72) Inventors: Michael Ben Oren, Ashqelon (IL); Ran Ben Oren, Ashqelon (IL)

( * ) Notice: Subject to any disclaimer, the term of this patent is extended or adjusted under 35 U.S.C. 154(b) by 0 days.

(21) Appl. No.: 16/465,235

(22) PCT Filed: Nov. 28, 2017

(86) PCT No.: PCT/IB2017/057443
§ 371 (c)(1),
(2) Date: May 30, 2019

(87) PCT Pub. No.: WO2018/100487
PCT Pub. Date: Jun. 7, 2018

(65) Prior Publication Data
US 2019/0346235 A1 Nov. 14, 2019

(30) Foreign Application Priority Data

Dec. 1, 2016 (IL) .......................................... 249353

(51) Int. Cl.
*F41G 1/38* (2006.01)
*F41A 35/00* (2006.01)
*F41G 1/473* (2006.01)
*F41G 3/06* (2006.01)
*F41G 3/08* (2006.01)

(52) U.S. Cl.
CPC ................ *F41G 1/38* (2013.01); *F41A 35/00* (2013.01); *F41G 1/473* (2013.01); *F41G 3/065* (2013.01); *F41G 3/08* (2013.01)

(58) Field of Classification Search
CPC ... F41G 1/00; F41G 1/027; F41G 1/14; F41G 1/38
See application file for complete search history.

(56) References Cited

U.S. PATENT DOCUMENTS

| | | | |
|---|---|---|---|
| 7,859,650 B2* | 12/2010 | Vermillion | F41G 1/473 356/141.1 |
| 2014/0226214 A1* | 8/2014 | Edwards | G02B 23/10 359/630 |
| 2014/0327962 A1* | 11/2014 | Teetzel | G02B 23/18 359/409 |

* cited by examiner

*Primary Examiner* — J. Woodrow Eldred (57) ABSTRACT

Disclosed are methods, circuits, components, apparatus, devices, assemblies and systems for imaging. According to some embodiments, there may be provided a sight for a firearm to assist in aiming the firearm towards a target in a field of view of the sight. A target-view optical assembly introduces additional light information to light passing from an objective-side aperture to a viewing-side aperture. A display array assembly renders and collimates the additional light information coupled into the passing light. And a controller causes a display array of the display array assembly to dynamically render a targeting reticle, wherein a location of the dynamically rendered targeting reticle on the display is a function of a distance to an intended target.

19 Claims, 5 Drawing Sheets

METHODS SYSTEMS CIRCUITS COMPONENTS APPARATUS DEVICES ASSEMBLIES AND COMPUTER EXECUTABLE CODE FOR AIMING A FIREARM

FIELD OF THE INVENTION

Some embodiments of the present invention relate generally to the field of imaging and optical sights. More specifically, the present invention relates to methods, systems, circuits, components, apparatus, devices, assemblies and functionally associated computer executable code for aiming a firearm, and for the analysis and display of: additional image scene information, data communicated from external sources, and/or incoming data from add-on sensors.

BACKGROUND

At its simplest, a sight is typically composed of two components, front and rear aiming pieces that have to be lined up. Sights such as this can be found on many types of devices including weapons, surveying and measuring instruments, and navigational tools.

On weapons, these sights are usually formed by rugged metal parts, giving these sights the name "iron sights", a term relative to other weapon sights in that they are not optical or computing sights. On many types of weapons they are built-in and may be fixed, adjustable, or marked for elevation, windage, target speed, etc. They also are classified in forms of notch (open sight) or aperture (closed sight). These types of sights can take considerable experience and skill in the user who has to hold a proper eye position and simultaneously focus on the rear sight, the front sight, a target at different distances, and align all three planes of focus.

Optical sights use optics that give the user an image of an aligned aiming point or pattern (also called a reticle) superimposed at the same focus as the target.

A telescopic sight is an optical telescope equipped with some form of graphic image pattern reticle mounted in an optically appropriate position in the optical system to give an accurate aiming point. Telescopic sights are used on a wide range of devices including guns, surveying equipment, and even as sights on larger telescopes (called a finderscope).

Another type of optical sight is the reflector (or "reflex") sight, a generally non-magnifying optical device that allows the user to look through a glass element and see a reflection of an illuminated aiming point or some other image superimposed on the field of view. These sights have been around for over 100 years and been used on all types of weapons and devices.

Reflector sights were first used as a weapon sight in German aircraft towards the end of World War I. Over the years they became more sophisticated, adding lead computing gyroscopes and electronics (the World War II Gyro gunsight) radar range finding and other flight information in the 1950s and 60s, eventually becoming the modern head-up display.

A holographic weapon sight or holographic diffraction sight is a non-magnifying gun sight that allows the user to look through a glass optical window and see a reticle image superimposed at a distance on the field of view. The hologram of the reticle is built into the window and is illuminated by a laser diode.

Most of today's reflex, holographic and telescopic sights manufacturers, however, use passive aiming sign/reticle, which are illuminated using an electronic light source. These require, in order to align the optical axes to the firearm's point of impact, high precision X-Y axes mechanical interface (AKA Zeroing System), which requires: time for manufacturing of parts, higher budget, high precision assembly, testing and qualification, and a higher overall cost and budget as more time is needed for high precision manufacturing and for system assembly and alignment.

Accordingly, there remains a need, in the field of imaging and optical sights, for methods, systems, circuits, components, apparatus, devices, assemblies and functionally associated computer executable code for aiming a firearm, and for the analysis and display of: additional image scene information, scene associated data communicated from external sources, and/or incoming scene and/or firearm associated data from add-on sensors.

SUMMARY OF INVENTION

The present invention includes methods, systems, circuits, components, apparatus, devices, assemblies and functionally associated computer executable code for aiming a firearm. According to some embodiments there is provided a firearm sight comprising: (1) An OLED Display for generating an image, wherein the image includes at least an active reticle image and one or more image layers of additional information; and (2) an Optical Interface for transferring the image generated by the OLED Display, to the eye of user, wherein the generated image is combined with a natural field of view of the 'window' of the sight. An OLED Display based firearm sight, as described herein, may utilize various reflector type or holographic type Optical Interfaces, and may be combined-with/integrated-into various firearm sight types, such as, but not limited to: a Reflex Sight, a Holographic Sight, and/or a Magnifying or Telescopic Sight.

According to some embodiments of the present invention, the OLED generated image may include an overlay, creating an Augmented/Mixed Reality Display in the natural field of view of the 'window' of the sight. The Augmented/Mixed Reality Display may facilitate: (i) the use of an active reticle, allowing for different types of aiming reticles, and/or for electronic zeroing and automatic reticle adjustment; (ii) the display of additional information, based on: analysis of the field of view image, data communicated from external sources, and/or incoming data from add-on sensors—through an Add-on Interface of the firearm sight.

According to some embodiments, additional information presented as part of the Augmented/Mixed Reality Display may include, but is not limited to: zeroing and reticle interfacing associated information, field of view (FOV) spot placement and positioning, targeting information, firearm operational information, firearm diagnostic/maintenance information, and/or firearm position/orientation information.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application.

In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, portable media players, cell phones, mobile devices, and/or automobile A/V accessories.

In some demonstrative embodiments the methods, devices and/or systems disclosed herein may be used in the field of Personal Computers (PC), for example, as part of any suitable desktop PC, notebook PC, monitor, and/or PC accessories.

In some demonstrative embodiments the methods, devices and/or systems disclosed herein may be used in the field of professional A/V, for example, as part of any suitable camera, video camera, and/or A/V accessories.

In some demonstrative embodiments the methods, devices and/or systems disclosed herein may be used in the medical field, for example, as part of any suitable endoscopy device and/or system, medical video monitor, and/or medical accessories.

In some demonstrative embodiments the methods, devices and/or systems disclosed herein may be used in the field of security and/or surveillance, for example, as part of any suitable security camera, and/or surveillance equipment.

In some demonstrative embodiments the methods, devices and/or systems disclosed herein may be used in the fields of military, defense, digital signage, commercial displays, retail accessories, and/or any other suitable field or application.

The present invention includes methods, systems, circuits, components, apparatus, devices, assemblies and functionally associated computer executable code for aiming a firearm. According to some embodiments there is provided a firearm sight comprising: (1) An OLED Display for generating an image, wherein the image includes at least an active reticle image and one or more image layers of additional information; and (2) an Optical Interface for transferring the image generated by the OLED Display, to the eye of user, wherein the generated image is combined with a natural field of view of the 'window' of the sight. An OLED Display based firearm sight, as described herein, may utilize various reflector type or holographic type Optical Interfaces, and may be combined-with/integrated-into various firearm sight types, such as, but not limited to: a Reflex Sight, a Holographic Sight, and/or a Magnifying or Telescopic Sight.

According to some embodiments, the Optical Interface may include:

(i) A Collimator for producing a parallel beam of rays from the OLED generated image, and a Beam Splitter for reflecting off the parallel beam OLED image while combining it with a natural field of view of the 'window' of the sight, such that a user (e.g. observer) may see the generated image at the focus of the collimator, superimposed in the natural field of view of the 'window' of the sight, and in focus, at any range.

(ii) A Collimating Reflector (e.g. Curved, Partially Silvered, Collimating Mirror) for producing a parallel beam of rays from the OLED generated image and reflecting it off while combining it with a natural field of view of the 'window' of the sight, such that a user (e.g. observer) may see the generated image at the focus of the collimator, superimposed in the natural field of view of the 'window' of the sight, and in focus, at any range.

And/or, (iii) A Collimating Reflector (e.g. Curved, Partially Silvered, Collimating Mirror) for producing a parallel beam of rays from the OLED generated image and reflecting it onto a Holographic Grating Component for separating the beam into its constituent wavelength components, wherein each wavelength of the input beam spectrum is dispersed into a different direction, and a Holographic Film onto which the constituent wavelength components of the beam, record, in three-dimensional space, and in the optical viewing 'window' of the sight, a reconstructed image, in the form of a transmission hologram of the active reticle and optionally one or more additional layers of information.

According to some embodiments of the present invention, the OLED generated image may include an overlay, creating an Augmented/Mixed Reality Display in the natural field of view of the 'window' of the sight. The Augmented/Mixed Reality Display may facilitate: (i) the use of an active reticle, allowing for different types of aiming reticles, and/or for electronic zeroing and automatic reticle adjustment; (ii) the display of additional information, based on: analysis of the field of view image, data communicated from external sources, and/or incoming data from add-on sensors—through an Add-on Interface of the firearm sight.

Figure 1A:
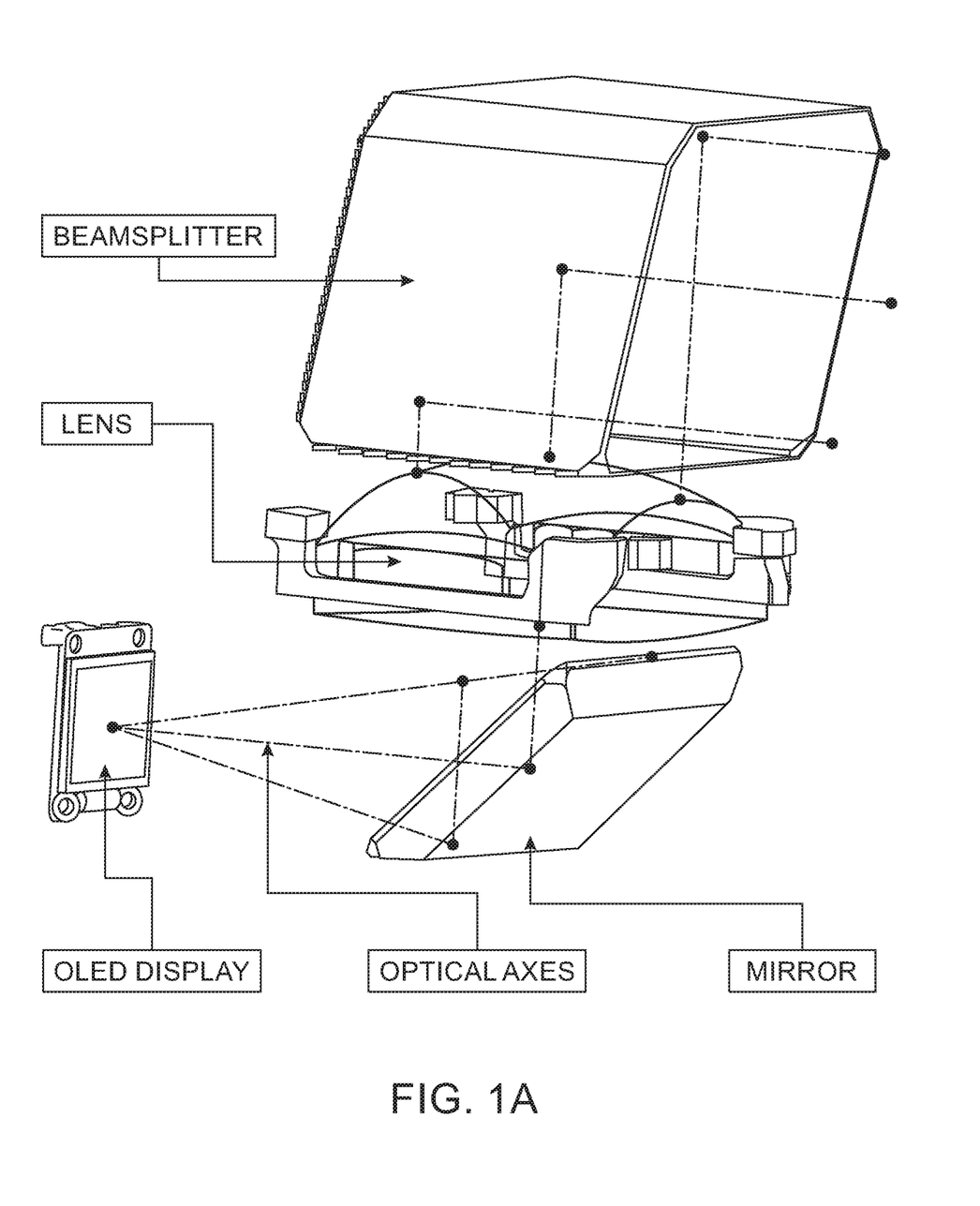
FIG. 1A is a drawing of an exemplary firearm sight arrangement, in accordance with some embodiments of the present invention, including an OLED Display for generating an image, and an Optical Interface.

According to some embodiments, additional information presented as part of the Augmented/Mixed Reality Display may include, but is not limited to: zeroing and reticle interfacing associated information, field of view (FOV) spot placement and positioning, targeting information, firearm operational information, firearm diagnostic/maintenance information, and/or firearm position/orientation information In FIG. 1A there is shown, in accordance with some embodiments of the present invention, an exemplary firearm sight arrangement including: (1) An OLED Display for generating an image; and (2) an Optical Interface, including a Mirror and a Lens, for transferring, and collimating the beam of, the image generated by the OLED Display; and a Beam Splitter for reflecting off the OLED image while combining it with a natural field of view of the 'window' of the sight, seen by the eye of the user.

Figure 1B:
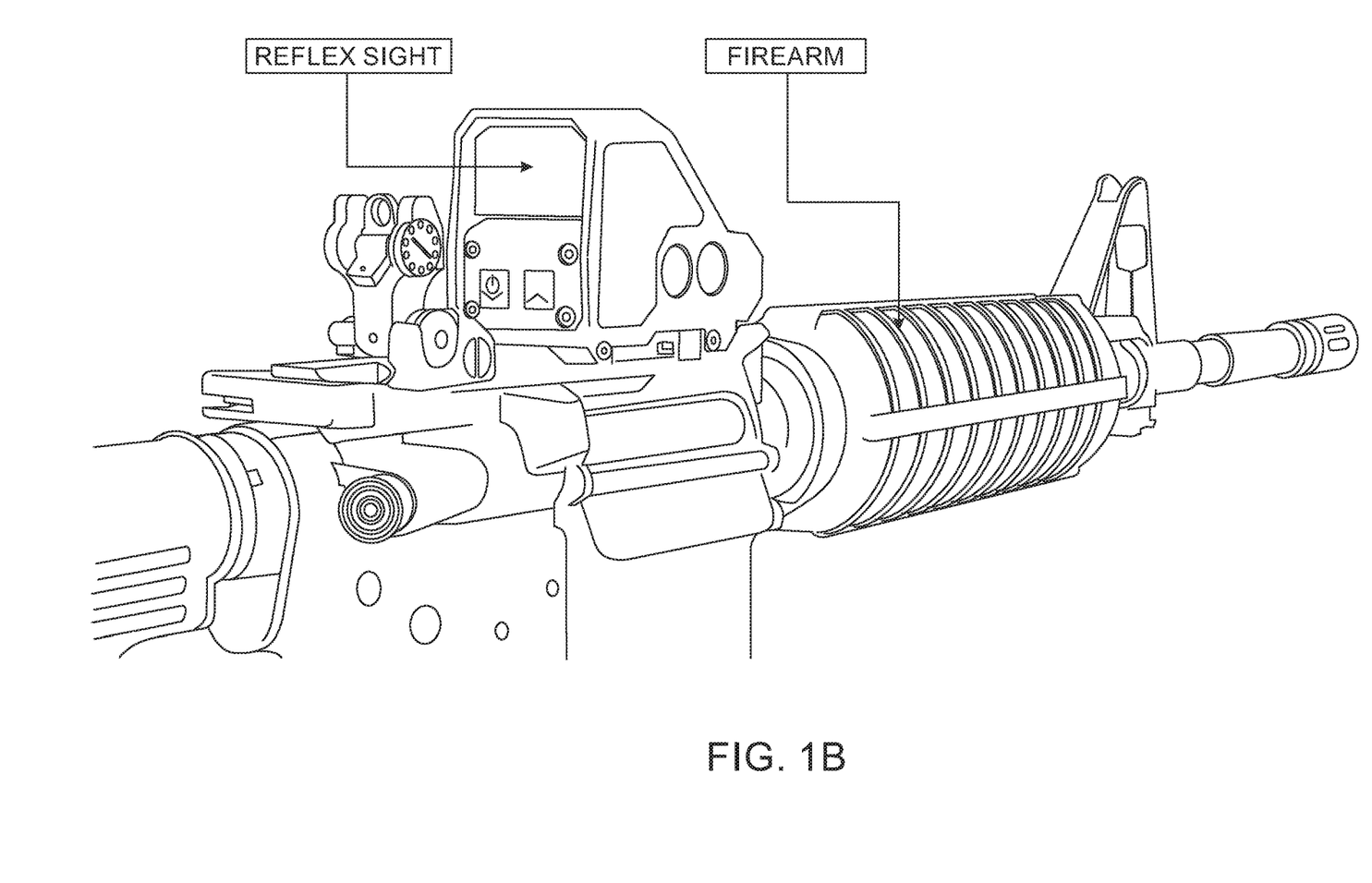
FIG. 1B is a drawing of an exemplary firearm sight mounted onto a firearm, in accordance with some embodiments of the present invention, including an OLED Display and an Optical Interface thereof.

In FIG. 1B there is shown, in accordance with some embodiments of the present invention, an exemplary firearm sight mounted onto a firearm and including an OLED Display and an Optical Interface thereof for transferring and utilizing images from the OLED Display as part of a Reflex Sight configuration, similar firearm sight configurations and/or arrangements may be likewise applicable to Holographic, Telescopic Sight, and/or any other kind of sight, known today or to be devised in the future.

According to some embodiments of the present invention, the firearm sight may include an OLED Image Display Logic for managing the presentation of the firearm aiming associated elements, and the information overlays, over/as-part-of the OLED generated image. The OLED Image Display Logic may comprise: (1) an Electronic Zeroing (and Automatic Reticle Adjustment) Module; and (2) an Information Overlay Module.

According to some embodiments, the OLED Image Display Logic, the OLED Display, the Optical Interface, and a Graphic Processor, may collectively constitute an imaging system, including (1) a Sensor/Add-On Interface and/or a Communication Module of the OLED Image Display Logic for receiving and collecting sensor information from a scene; (2) the Electronic Zeroing and Automatic Reticle Adjustment Module and/or the Information Overlay Module for digitizing and processing the collected scene information; (3) the Graphic Processor for substantially in real-time rendering the processed scene information, and/or a visual/graphic interpretation thereof, onto the OLED Display; (4) the OLED Display for generating a photonic output based thereof; and/or (5) the Optical Interface for transferring and collimating, a photonic output of the OLED Display into a substantially parallel/collimated projection of the rendered/displayed scene information, wherein the collimated projection column is characterized by a size and configuration suitable for viewing of the image information contained therein by either or both eyes of a viewer from a range of viewing distances and viewing angles.

According to some embodiments, the OLED Image Display Logic, the OLED Display, and the Optical Interface may collectively implement a method for imaging, including the steps of: (1) receiving and collecting sensor information from a scene; (2) digitizing and processing the collected scene information; (3) substantially in real-time rendering the processed scene information, and/or a visual/graphic interpretation thereof, onto an OLED Display; (4) generating a photonic output based thereof; and/or (5) transferring and collimating a photonic output of the OLED Display into a substantially parallel/collimated projection of the rendered/displayed scene information, wherein the collimated projection column is characterized by a size and configuration suitable for viewing of the image information contained therein by either or both eyes of a viewer from a range of viewing distances and viewing angles.

According to some embodiments, the Electronic Zeroing Module may electronically align the optical axes of the image rendered to the OLED display, to the firearm point of impact, and/or control the operation, selection and/or display characteristics of the displayed active aiming reticle, based on the processing of data form: (i) a Measurement-Unit including a combination of one or more orientational and/or environmental sensor(s) (e.g. onboard sensors—for example '9/10 DOF (degrees of freedom)'—including: XYZ magnetometer, XYZ accelerometer, XYZ gyro and barometric pressure sensor); (ii) a GPS, a camera (daylight or thermal), a motion and color detection software, an automatic target acquisition component, and/or sight/optics speechless communications components; and/or (iii) a caliber/type of bullet based logic, using/referencing a database with trajectory models/profiles while also factoring: firearm barrel length, firearm silencer or other barrel devices, firearm orientation sensors data—pitch/roll/yaw, and/or firearm environment sensors data—air temperature/air pressure/humidity.

According to some embodiments, the Electronic Zeroing Module may automatically select and facilitate the display of different types of aiming reticles. Reticle selection and display characteristics may, for example, be based on: gut estimations or manual selection through a user interface, entered range (e.g. automatically, manually), and/or lighting or visibility conditions.

According to some embodiments, the Electronic Zeroing Module may receive sensors and on-board (firearm) modules data through a Sensor/Add-On Interface. Information from external sources such as: other troops or units, command headquarters, real-time intelligence sources, and/or collaboration systems, may be received through a Communication Module.

According to some embodiments, the Information Overlay Module may create an augmented/mixed reality display by rendering layers of information onto the image generated by the OLED Display. The 'information layers' including image, may be transferred through the Optical Interface and seen by the eye of a viewing user, in combination with the natural field of view of the scene viewed through the sight. The information in the rendered layers may be presented as text, diagram or animation; and/or as indications or mapping (e.g. borders, pointers, colors, patterns, and brightness) of elements in the natural field of view of the sight.

According to some embodiments, layers of information rendered by the Information Overlay Module, may include, but are not limited to, the following information layer types: (i) a Targeting Layer—providing: thermal outline of target, ranging information to target, size and shape characterization of target, target 'friend or foe' identification, and/or the like; (ii) a Firearm Operational Layer—providing remaining ammunition figures (e.g. number of bullets left in magazine, number of grenades left in launcher), and and/or the like; (iii) a Firearm Diagnostic/Maintenance Information Layer—providing: firearm part breakage, part failure/malfunctioning, part repair/replacement time, next firearm checkup (e.g. time based, usage [e.g. bullets shot] based, time and usage combination based), and/or firearm/sight 'recalibration/zeroing is recommended/required'—notifications and indications (e.g. including broken/failing part indication/identification); (iv) a Firearm Positioning and Orientation Layer—providing: Direction of Firearm, Firearm Azimuth, and/or Pitch/Roll/Yaw of the firearm.

Figure 2:
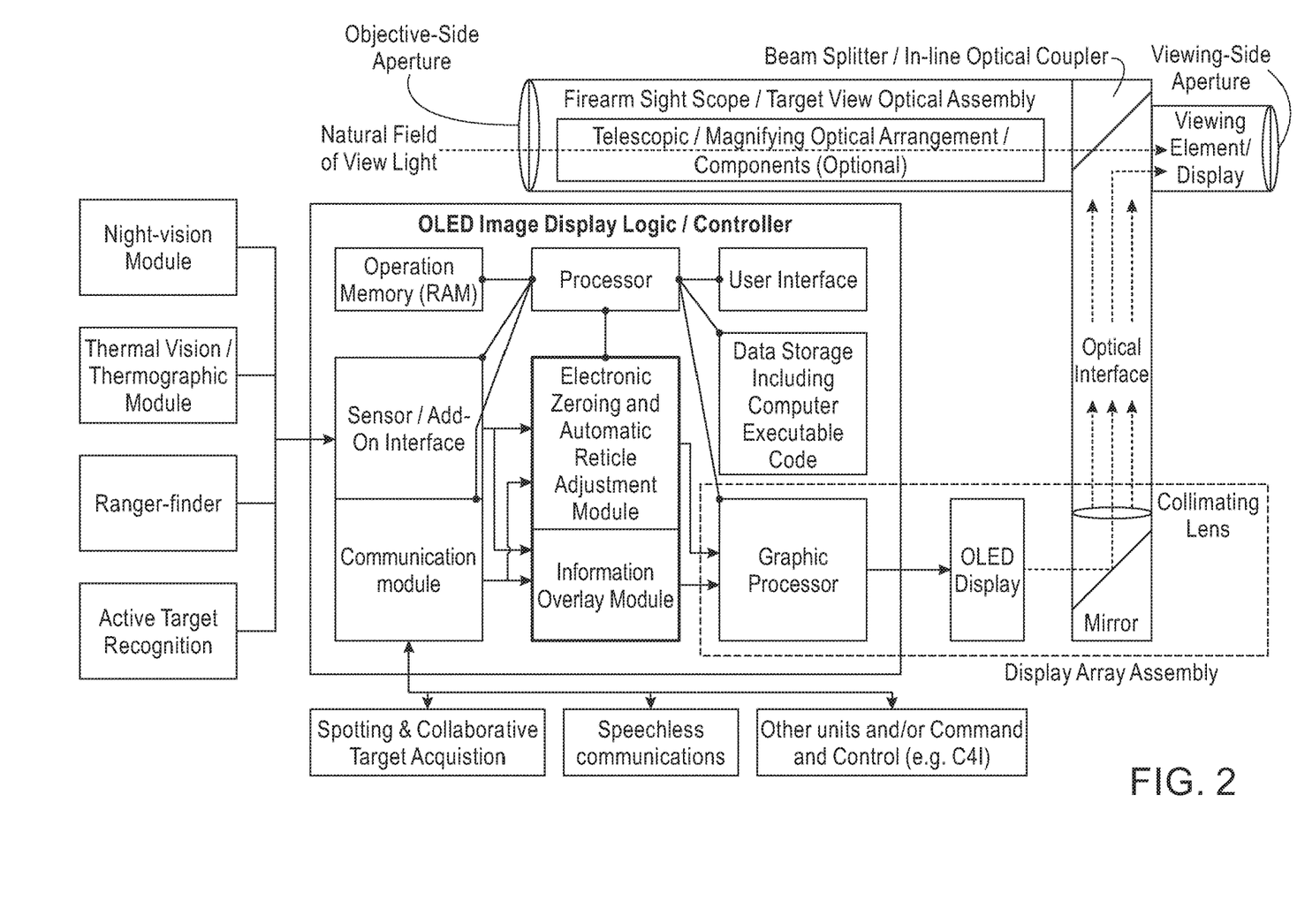
FIG. 2 is a block diagram of an exemplary firearm sight configuration, in accordance with some embodiments of the present invention, comprising: an OLED Image Display Logic, an OLED Display, and an Optical Interface. The shown OLED Image Display Logic includes an Electronic Zeroing and Automatic Reticle Adjustment Module and an Information Overlay Module.

In FIG. 2 there is shown, in accordance with some embodiments of the present invention, an exemplary firearm sight configuration comprising: an OLED Image Display Logic, an OLED Display, and an Optical Interface. The shown OLED Image Display Logic includes an Electronic Zeroing and Automatic Reticle Adjustment Module and an Information Overlay Module, operated/controlled by a Processor functionally associated with an Operation Memory (e.g. RAM), a User Interface, and a Data Storage. The OLED Image Display Logic may, in accordance with some embodiments, be implemented over a PCB (printed circuit board) or as a SoC (System on Chip). In the figure, scene data from: a night vision module, a thermal vision module, a range finder, and an active target recognition component, is received through a Sensor/Add-On Interface; and scene data from: a spotting and collaborative target acquisition system, a speechless communication system, and from other (e.g. military, LEAs (Law Enforcement Agencies)) units or command and control centers, is received through a Communication Module.

The received data is digitized and processed by the Electronic Zeroing and Automatic Reticle Adjustment Module and/or by the Information Overlay Module, to provide, firearm aiming and reticle associated information and/or scene associated information, respectively. The processed information is then relayed for rendering, onto the shown OLED Display, by a Graphic Processor. The OLED Display generates a photonic output (e.g. image) based on the rendered information, and the Optical Interface—shown utilizing a mirror, a collimating lens and a beam splitter—for transferring and collimating, the photonic output of the OLED Display into a substantially parallel/collimated projection of the rendered/displayed scene information, wherein the collimated projection column is combined with the natural field of view of the scene, entering through an objective-side aperture, passing through the 'firearm sight scope'/'target view optical assembly', for viewing of the combined image information contained therein, through a viewing element/display and/or a viewing side aperture, by either or both eyes of a viewer and optionally from a range of viewing distances and viewing angles.

The 'firearm sight scope'/'target view optical assembly', of a sight in accordance with some embodiments of the present invention, may comprise one or more magnifying optical components (e.g. lens, mirrors) giving it telescopic capabilities for viewing remote objects. The telescopic/magnifying optical components, may include, but are not limited to: refractors, lenses (dioptrics) based components; reflectors, mirrors (catoptrics) based components; and/or catadioptric optical/telescopic capabilities/components, combining lenses and mirrors.

Figure 3A:
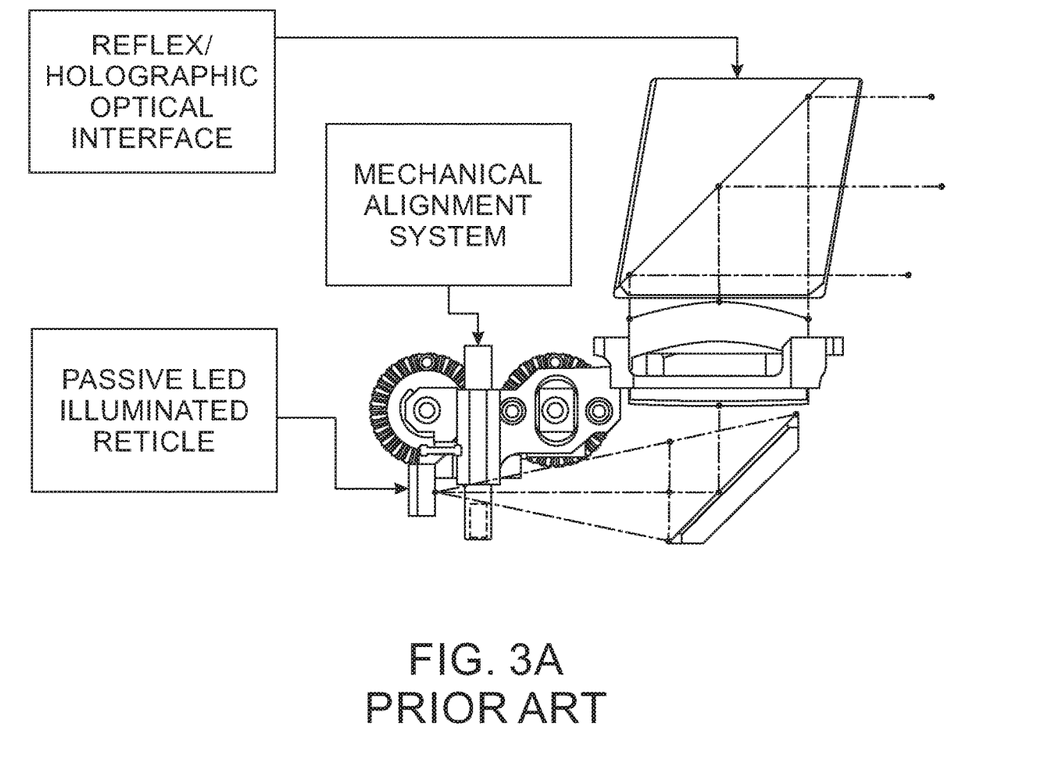
FIG. 3A is a drawing of a prior-art configuration of a firearm sight, wherein alignment of the optical axes of: an image of a passive LED illuminated reticle, and the point of impact of the firearm to which the firearm sight is connected—is performed by a mechanical alignment system.

In FIG. 3A there is shown a prior-art configuration of a firearm sight, wherein alignment of the optical axes of: an image of a passive LED illuminated reticle, and the point of impact of the firearm to which the firearm sight is connected—is performed by a mechanical alignment system.

Figure 3B:
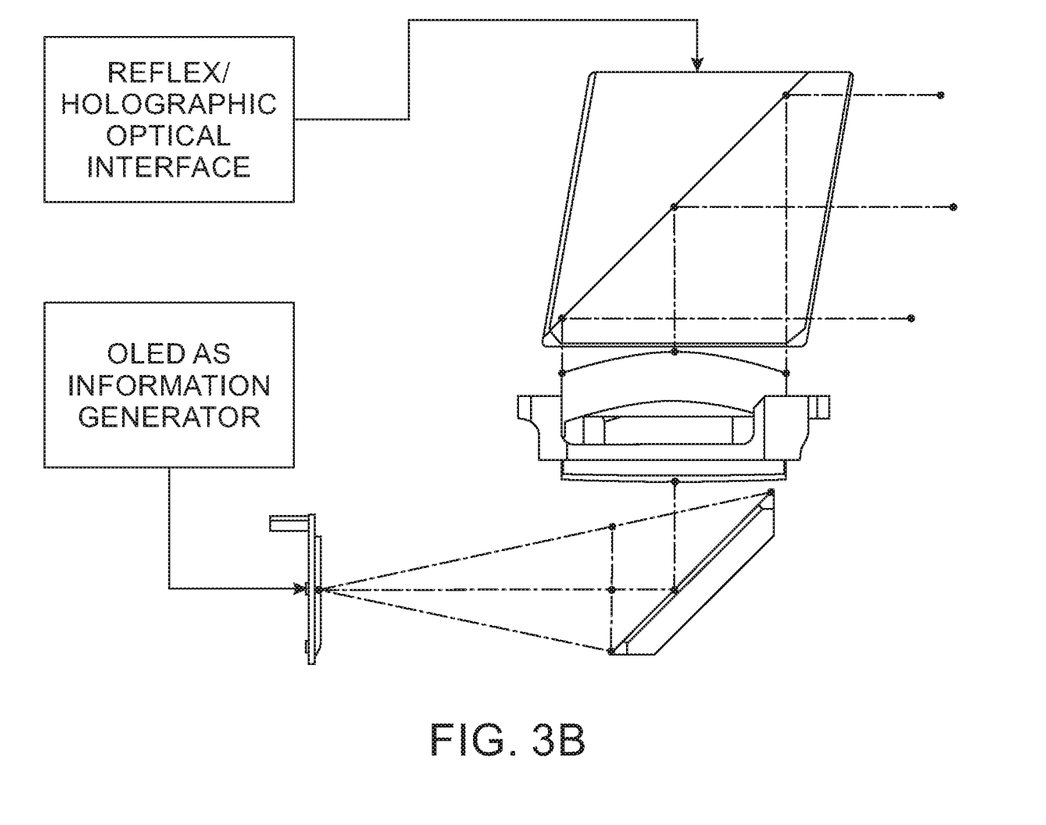
FIG. 3B is a drawing of a configuration of a firearm sight, in accordance with some embodiments of the present invention, wherein the OLED Display is the information (e.g. reticle image, information layers) generator, and alignment of the optical axes of: the active reticle rendered onto the OLED display, and the point of impact of the firearm to which the firearm sight is connected—is performed electronically.

In FIG. 3B there is shown a configuration of a firearm sight, in accordance with some embodiments, wherein the OLED Display is the information (e.g. reticle image, information layers) generator, and alignment of the optical axes of: the active reticle rendered onto the OLED display, and the point of impact of the firearm to which the firearm sight is connected—is performed electronically.

According to some embodiments of the present invention, a sight for a firearm may assist in aiming the firearm towards a target in a field of view of the sight, the sight may comprise: (1) a target view optical assembly including an objective-side aperture to receive light from the field of view, a viewing-side aperture through which light from the field of view exits the sight, and an in-line optical coupler to introduce additional light information to light passing from the objective-side aperture to the viewing-side aperture; (2) a display array assembly to render and collimate additional light information coupled into the light passing from the objective-side aperture to the viewing-side aperture; and (3) a controller to cause a display array of the display array assembly to dynamically render a targeting reticle, wherein a location of the dynamically rendered targeting reticle on the display is a function of a distance to an intended target.

According to some embodiments, the controller may be connected to a user interface and adapted to receive firearm zeroing associated user inputs from one or more interface elements of the user interface. The controller may determine the location of the dynamically rendered targeting reticle on the display, at least partially based on firearm zeroing associated user inputs from the one or more interface elements of the user interface.

According to some embodiments, the controller may be connected to a laser range finder for assessing the distance to a target aimed at. The controller may determine the location of the dynamically rendered targeting reticle on the display, at least partially based on target range values received from said laser range finder.

According to some embodiments, the controller may be connected to a sensor/add-on Interface for receiving firearm aiming associated inputs from one or more firearm orientation sensors. The orientation sensors may be selected from a group consisting of: a magnetometer, an accelerometer, and/or a gyro. The display array assembly may render as additional light information, and may collimate, the information from the orientation sensors, and the in-line optical coupler may introduce the additional information to light passing from the objective-side aperture to the viewing-side aperture.

According to some embodiments, the controller may be connected to a sensor/add-on Interface for receiving firearm aiming associated inputs from one or more firearm environment sensors. The environment sensors may be selected from a group consisting of: a GPS, a Camera, an image object motion/color detection software, a barometric pressure sensor, a temperature sensor, and/or a wind direction/speed sensor. The display array assembly may render as additional light information, and collimate, the information from the environment sensors, and the in-line optical coupler may introduce the additional information to light passing from the objective-side aperture to the viewing-side aperture.

According to some embodiments, the controller may be connected to a communication module for receiving firearm aiming associated information from networked data sources. The communicated networked data sources may be selected from a group consisting of: a collaborative target acquisition data source, a speechless communication system, other military units, and/or command and control unit. The display array assembly may render as additional light information, and collimate, the information from the communication module, and the in-line optical coupler may introduce the additional information to light passing from the objective-side aperture to the viewing-side aperture.

According to some embodiments, the controller may be connected to a night-vision module for receiving additional field of view associated information. The night-vision module may be a thermographic imaging module.

According to some embodiments, the display array assembly may render the additional light information as at least partially transparent overlays, and the in-line optical coupler may introduce the transparent overlays into the field of view light passing from the objective-side aperture to the viewing-side aperture. The at least partially transparent overlays may be selected from a group consisting of: a targeting layer, an operational layer, a diagnostic/maintenance layer, a positioning and orientation layer.

According to some embodiments, the target view optical assembly of the sight may further comprise one or more magnifying optical components giving it telescopic capabilities for viewing remote objects.

The subject matter described above is provided by way of illustration only and should not be constructed as limiting. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A sight for a firearm to assist in aiming the firearm towards a target in a field of view of the sight, said sight comprising:
   a target view optical assembly including a fixed objective-side aperture to receive light from the field of view, a fixed viewing-side aperture through which light from the field of view exits said sight, and a fixed in-line optical coupler to introduce display generated light emissions to light passing from said objective-side aperture to said viewing-side aperture;
   a display array assembly including a 2D array of individually activatable photon emitting elements to emit light representing a targeting reticle, which light is coupled into the light passing from said objective-side aperture to said viewing-side aperture, wherein a coupling position of the targeting reticle light into the light passing from said objective-side aperture to said viewing-side aperture, where it is displayed, is a function of which photon emitting elements are digitally selected for activation; and
   a controller to, based on an intended display position of a targeting reticle on said viewer-side aperture, select and activate one or more specific photon emitting elements of said display array assembly to dynamically project the targeting reticle light onto the intended display position on said viewer-side aperture.

2. The sight according to claim 1 wherein said controller is connected to a user interface and adapted to receive firearm zeroing associated user inputs from one or more interface elements of said user interface.

3. The sight according to claim 2 wherein said controller determines the location of the dynamically rendered targeting reticle on said display array assembly, at least partially based on firearm zeroing associated user inputs from the one or more interface elements of said user interface.

4. The sight according to claim 1 wherein said controller is connected to a laser range finder for assessing the distance to a target aimed at.

5. The sight according to claim 4 wherein said controller determines the location of the dynamically rendered targeting reticle on said display array assembly, at least partially based on target range values received from said laser range finder.

6. The sight according to claim 1 wherein said controller is connected to a sensor/add-on Interface for receiving firearm aiming associated inputs from one or more firearm orientation sensors.

7. The sight according to claim 6 wherein said orientation sensors are selected from a group consisting of: a magnetometer, an accelerometer, and a gyro.

8. The sight according to claim 7 wherein said display array assembly renders as additional light information, and collimates, the information from said orientation sensors, and wherein said in-line optical coupler introduces the additional information to light passing from said objective-side aperture to said viewing-side aperture.

9. The sight according to claim 1 wherein said controller is connected to a sensor/add-on Interface for receiving firearm aiming associated inputs from one or more firearm environment sensors.

10. The sight according to claim 9 wherein said environment sensors are selected from a group consisting of: a GPS, a Camera, an image object motion/color detection software, a barometric pressure sensor, a temperature sensor, and a wind direction/speed sensor.

11. The sight according to claim 10 wherein said display array assembly renders as additional light information, and collimates, the information from said environment sensors, and wherein said in-line optical coupler introduces the additional information to light passing from said objective-side aperture to said viewing-side aperture.

12. The sight according to claim 1 wherein said controller is connected to a communication module for receiving firearm aiming associated information from networked data sources.

13. The sight according to claim 12 wherein said communicated networked data sources are selected from a group consisting of: a collaborative target acquisition data source, a speechless communication system, other military units, and command and control unit.

14. The sight according to claim 13 wherein said display array assembly renders as additional light information, and collimates, the information from said communication module, and wherein said in-line optical coupler introduces the additional information to light passing from said objective-side aperture to said viewing-side aperture.

15. The sight according to claim 1 wherein said controller is connected to a night-vision module for receiving additional field of view associated information.

16. The sight according to claim 15 wherein said night-vision module is a thermographic imaging module.

17. The sight according to claim 1 wherein said display array assembly renders the additional light information as at least partially transparent overlays, and wherein said in-line optical coupler introduces the transparent overlays into the field of view light passing from said objective-side aperture to said viewing-side aperture.

18. The sight according to claim 17 wherein the at least partially transparent overlays are selected from a group consisting of: a targeting layer, an operational layer, a diagnostic/maintenance layer, a positioning and orientation layer.

19. The sight according to claim 1 wherein said target view optical assembly further comprises one or more magnifying optical components giving it telescopic capabilities for viewing remote objects.

* * * * *